(12) United States Patent
Zhang et al.

(10) Patent No.: US 12,415,325 B2
(45) Date of Patent: Sep. 16, 2025

(54) REAL-TIME ADJUSTMENT DEVICE FOR THE WIDTH AND THICKNESS OF IMPREGNATED FIBER BUNDLES

(71) Applicant: BEIHANG UNIVERSITY, Beijing (CN)

(72) Inventors: Wuxiang Zhang, Beijing (CN); Junling Xiong, Beijing (CN); Jiarui Zhang, Beijing (CN); Huichao Deng, Beijing (CN); Xilun Ding, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 223 days.

(21) Appl. No.: 18/220,347

(22) Filed: Jul. 11, 2023

(65) Prior Publication Data
US 2023/0347602 A1 Nov. 2, 2023

Related U.S. Application Data

(63) Continuation of application No. PCT/CN2021/075793, filed on Feb. 7, 2021.

(30) Foreign Application Priority Data

Jan. 11, 2021 (CN) .......................... 202110031133.5

(51) Int. Cl.
  *B29C 70/50* (2006.01)
  *B29C 70/54* (2006.01)
  *G01B 11/06* (2006.01)

(52) U.S. Cl.
  CPC ............ *B29C 70/543* (2013.01); *G01B 11/06* (2013.01)

(58) Field of Classification Search
  CPC ........... B21B 1/08; B21B 1/0805; B21B 1/24; B21B 37/16; B21B 37/165; B21B 37/18;
  (Continued)

(56) References Cited

U.S. PATENT DOCUMENTS

| | | | | |
|---|---|---|---|---|
| 21,692 A | * | 10/1858 | Morris | ...................... B21B 1/22 29/17.2 |
| 672,466 A | * | 4/1901 | Wayland-Smith | .... B21B 37/165 72/12.7 |

(Continued)

FOREIGN PATENT DOCUMENTS

| | | |
|---|---|---|
| CN | 103409833 A | 11/2013 |
| CN | 104178847 A | 12/2014 |

(Continued)

OTHER PUBLICATIONS

International Search Report of PCT/CN2021/075793, Aug. 30, 2021.

*Primary Examiner* — Matthew J Daniels
(74) *Attorney, Agent, or Firm* — Troutman Pepper Locke LLP; Tim Tingkang Xia, Esq.

(57) ABSTRACT

A real-time adjustment device for width and thickness of impregnated fiber bundles includes a width and thickness adjustment mechanism and a width measuring laser mechanism. The width and thickness adjustment mechanism is arranged under a filar guide, and is moved vertically by a cylinder. The width and thickness adjustment mechanism has a hollow concave roller and a hollow convex roller arranged vertically. A position of the hollow convex roller is fixed. Vertical positions of the hollow concave roller are controllable. Fibers pass between the hollow concave roller and the hollow convex roller. The width measuring laser mechanism is arranged between the filar guide and a processing workpiece to measure the fiber width in real-time and send the measurement results back to the control system. The position of the hollow convex roller can be adjusted based on the error between the width and the preset value.

3 Claims, 5 Drawing Sheets

(58) Field of Classification Search
CPC ......... B21B 37/28; B21B 37/36; B21B 37/58; B21B 37/60; B21B 38/04; B21B 38/10; B21B 1/12; B21B 1/22; B29C 70/504; G01B 11/10; G01B 11/105

See application file for complete search history.

(56) References Cited

U.S. PATENT DOCUMENTS

| | | | | |
|---|---|---|---|---|
| 1,106,172 A * | 8/1914 | Wetcke | ............... | B21B 1/24 |
| | | | | 72/197 |
| 1,327,826 A * | 1/1920 | Jameson | ............... | B29C 70/504 |
| | | | | 156/437 |
| 1,814,354 A * | 7/1931 | Webster | ............... | B21B 37/60 |
| | | | | 72/12.7 |
| 1,969,536 A * | 8/1934 | Winne | ............... | G05D 5/03 |
| | | | | 324/229 |
| 2,094,973 A * | 10/1937 | Taugher | ............... | B21B 37/60 |
| | | | | 318/567 |
| 2,818,904 A * | 1/1958 | Ambrose | ............... | B29C 43/44 |
| | | | | 384/417 |
| 2,961,901 A * | 11/1960 | Wheeler | ............... | B21B 31/24 |
| | | | | 72/11.8 |
| 3,158,049 A * | 11/1964 | Huntley | ............... | B21B 37/18 |
| | | | | 72/10.3 |
| 3,212,310 A * | 10/1965 | Brys | ............... | B21B 37/16 |
| | | | | 72/8.6 |
| 3,266,279 A * | 8/1966 | Wright | ............... | B21B 37/16 |
| | | | | 318/632 |
| 3,401,547 A * | 9/1968 | Hall | ............... | B21B 38/04 |
| | | | | 72/11.8 |
| 3,461,705 A * | 8/1969 | Neumann | ............... | B21B 29/00 |
| | | | | 72/241.8 |
| 3,550,279 A * | 12/1970 | Fapiano | ............... | B21B 38/04 |
| | | | | 33/501.03 |
| 4,559,005 A * | 12/1985 | Gants | ............... | B29D 99/0017 |
| | | | | 425/363 |
| 5,311,814 A * | 5/1994 | Kierson | ............... | B44B 5/028 |
| | | | | 101/22 |
| 5,996,384 A * | 12/1999 | Steeper | ............... | B21B 37/68 |
| | | | | 72/8.3 |
| 2006/0230799 A1* | 10/2006 | Ogawa | ............... | B21B 37/28 |
| | | | | 72/10.4 |
| 2014/0283573 A1* | 9/2014 | Ishii | ............... | B21B 38/06 |
| | | | | 72/241.2 |
| 2023/0356278 A1* | 11/2023 | Zielenbach | ............... | B21B 37/62 |

FOREIGN PATENT DOCUMENTS

| | | |
|---|---|---|
| CN | 106426982 A | 2/2017 |
| CN | 107314970 A | 11/2017 |
| CN | 206945648 U | 1/2018 |
| CN | 108327316 A | 7/2018 |
| CN | 211713318 U | 10/2020 |
| EP | 0393420 A1 | 10/1990 |
| JP | 2008240234 A | 10/2008 |

* cited by examiner

REAL-TIME ADJUSTMENT DEVICE FOR THE WIDTH AND THICKNESS OF IMPREGNATED FIBER BUNDLES

CROSS-REFERENCE TO RELATED PATENT APPLICATION

This application is a continuation application of International Patent Application No. PCT/CN2021/075793, filed on Feb. 7, 2021, which itself claims priority to Chinese Patent Application No. CN202110031133.5 filed in China on Jan. 11, 2021. The disclosures of the above applications are incorporated herein in their entireties by reference.

FIELD OF THE INVENTION

This invention relates to the field of composite material molding equipment, specifically, a real-time adjustment device for the width and thickness impregnated fiber bundles.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Composite materials have the advantages of being lightweight, high strength, fatigue-resistant, and corrosion-resistant, and they are easy to manufacture large and complex components. The overall mechanical properties of composite materials are generally superior to those of metal materials. Composite materials are widely used in the fields of aviation and aerospace, energy, transportation, defense, and other fields, and their importance in manufacturing is increasing.

During the composite material molding process, uneven spreading and thickening of fiber bundles can cause excessive voids, resulting in decreased performance of fiber products and reduced production efficiency. Therefore, it is crucial to adjust the width and thickness of the fiber bundles.

SUMMARY OF THE INVENTION

A filar guide with adjustable bundles width and thickness for continuous fiber composite processing has been proposed. The filar guide is typically located between the fiber raw material and the processing workpiece, and consists of three parts: a body frame, a width and thickness adjustment mechanism and a width measuring laser mechanism. The body frame is a component that connects and fixes the structure to the filar guide, the width and thickness adjustment mechanism is the executive mechanism for adjusting the fiber width and thickness, and the width measuring laser mechanism monitors the width of the expanded fiber and feeds back to the aforementioned executive mechanism. This device can achieve real-time online control of fiber width and thickness, making it suitable for processing various types of composite materials for the construction of shaped surfaces. These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION OF EMBODIMENTS

Figure 1:
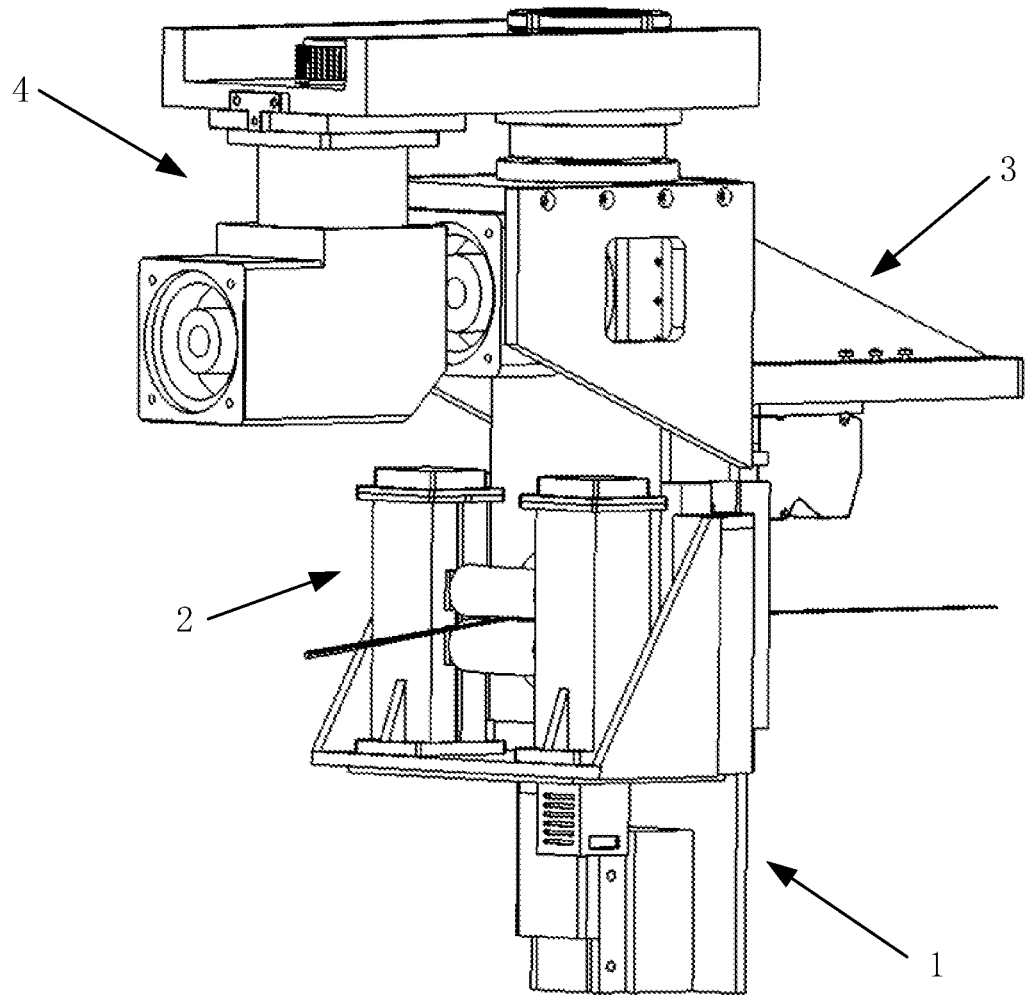
FIG. 1 shows the overall structure of a real-time adjustment device for the width and thickness of impregnated fiber bundles.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within percent, preferably within 10 percent, and more preferably within 5 percent of a given value or range. Numerical quantities given herein are approximate, meaning that the term "around", "about" or "approximately" can be inferred if not expressly stated.

The following detailed description describes in detail the characteristics and advantages of the instant disclosure, whose content is sufficient to enable any person skilled in the relevant art to understand the technical content of the instant disclosure and implement accordingly, and according to the content, the claims and figures disclosed by the present specification, any person skilled in the relevant art can easily understand the purpose and advantages of the instant disclosure. The following embodiments further illustrate the aspects of the instant disclosure, but do not limit the scope of the instant disclosure with any aspects.

The present invention provides a real-time adjustment device for width and thickness of impregnated fiber bundles, as shown in FIG. 1, comprising a body frame 1, a width and thickness adjustment mechanism 2, and a width measuring laser mechanism 3.

Figure 2:
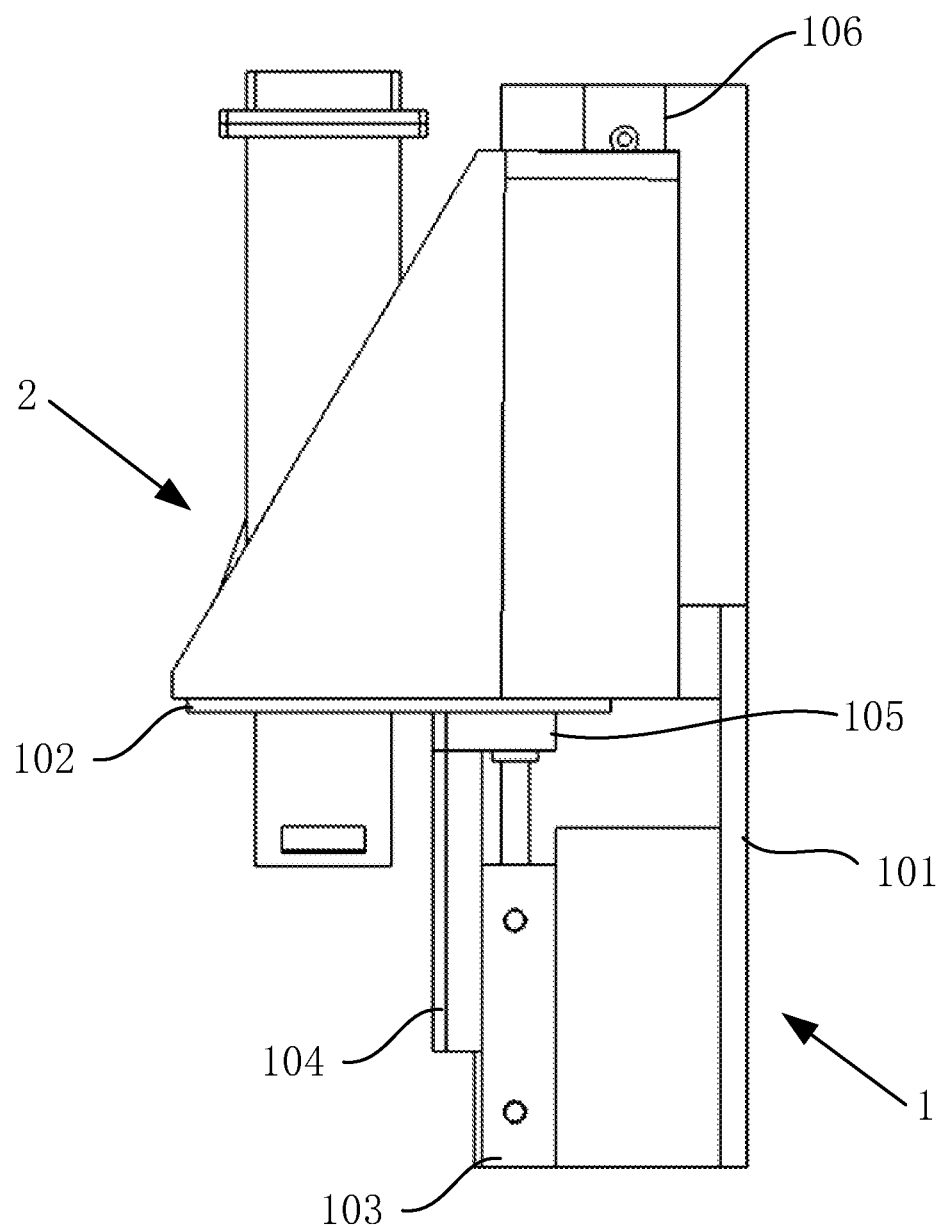
FIG. 2 shows a side view of the adjustment actuator of the real-time adjustment device for width and thickness of impregnated fiber bundles depicted in FIG. 1.

The body frame 1 includes the width adjustment mechanism mounting frame and cylinder, as shown in FIG. 2. The width adjustment mechanism mounting frame has a vertical plate 101 and a horizontal plate 102. The cylinder is a sliding table cylinder, including a cylinder body 103, a cylinder side plate 104, and a cylinder top plate 105. The cylinder body 103 is fixed to the middle of the rear side of the vertical plate 101, and the cylinder rod of the cylinder body 103 extends upwards along the vertical direction. The cylinder side plate 104 and the body portion of the cylinder body are slidably connected to each other, and can move along the vertical direction. The cylinder top plate 105 is fixed to the top of the cylinder rod and is fixed to the top end of the cylinder side plate 104. The upper surface of the cylinder top plate 105 is used to fix and install the width and thickness adjustment mechanism 2. Therefore, the cylinder body 103 drives the cylinder rod to perform telescopic movement through pneumatic adjustment, and then drives the cylinder side plate 104 and the cylinder top plate 105 to move vertically together, thereby realizing the vertical movement control of the width and thickness adjustment mechanism 2. The longitudinal rails 106 are fixedly installed on the left and right sides of the vertical plate 101, and are used for slidingly connecting the width and thickness adjustment mechanism 2.

Figure 3:
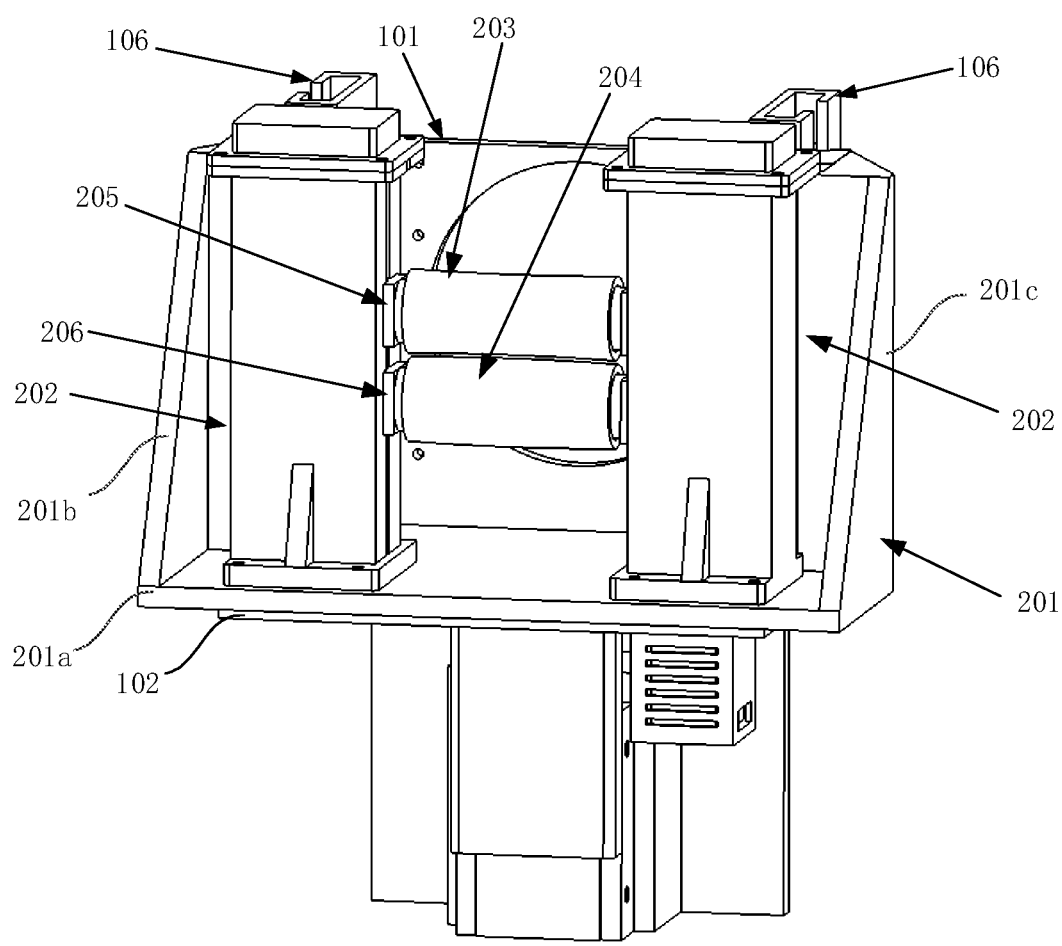
FIG. 3 shows annotated structural details of the mechanism depicted in FIG. 2.
Figure 4:
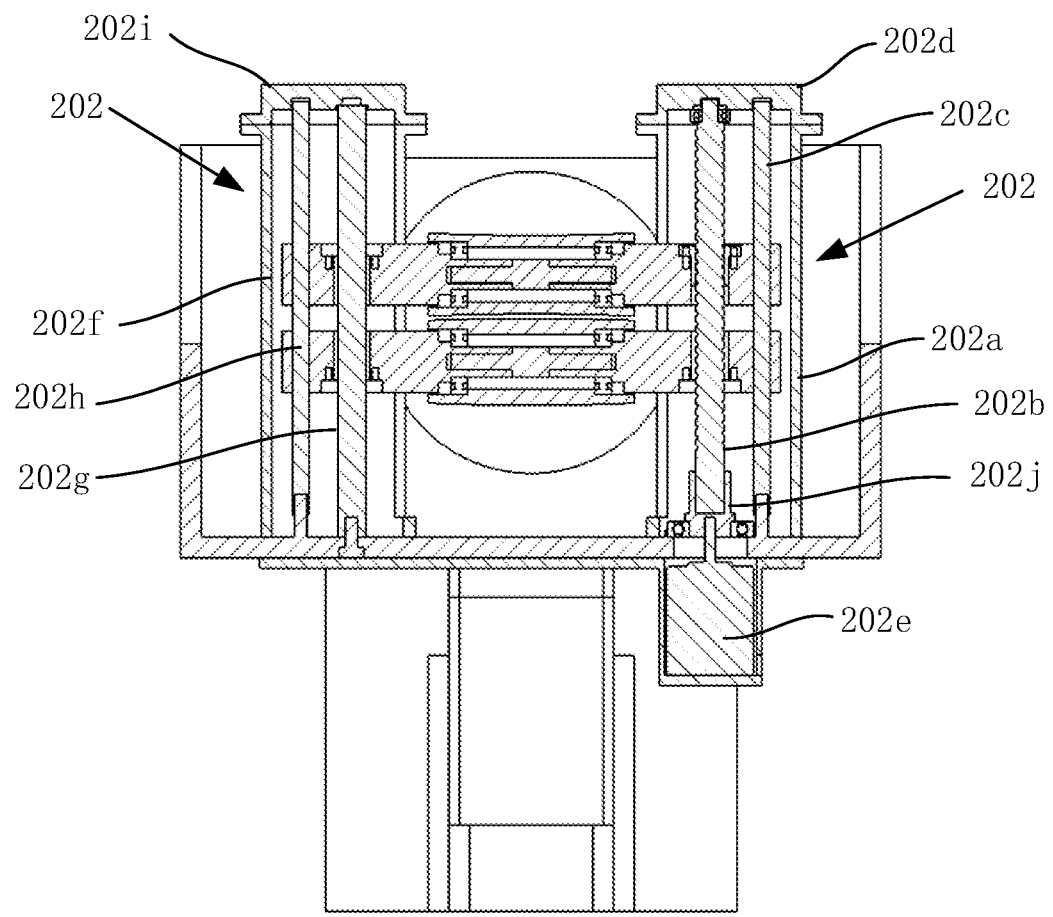
FIG. 4 shows a detailed sectional view of the mechanism shown in FIG. 3.

The width and thickness adjustment mechanism 2 includes a width adjustment supporting stand 201, a screw drive mechanism 202, a hollow concave roller 203, a hollow convex roller 204, a concave roller slider 205, and a convex roller slider 206, as shown in FIG. 3 and FIG. 4.

The width adjustment supporting stand 201 is a U-shaped frame structure consisting of a bottom plate 201a, a left side plate 201b, and a right side plate 201c. The middle of the bottom plate 201a is fixed to the upper surface of the cylinder top plate 105. The left side plate 201b and the right side plate 201c are designed with sliders, which respectively cooperate with the sliding rails 106 on the left and right sides of the vertical plate 101 in width and thickness adjustment mechanism 2 to achieve the stability of the up-and-down movement of the width and thickness adjustment mechanism 2.

The screw drive mechanism 202 includes a left guiding mechanism and a right driving mechanism. The right driving mechanism consists of a right column-shaped shell 202a, a right screw 202b, a right guide rod 202c, a right protective cover 202d, and a driving motor 202e. The left guiding mechanism consists of a left column-shaped shell 202f, a left coarse guide rod 202g, a left fine guide rod 202h, and a left protective cover 202i.

In the right driving mechanism, the right column-shaped shell 202a is vertically installed with its bottom fixed on the right side of the surface of the bottom plate 201a of the width adjustment supporting stand 201. The top is fixedly installed with the right protective cover 202d, which protects the internal components. The right screw 202b and the right guide rod 202c are installed inside the right column-shaped shell 202a in a vertical manner. The top end of the right screw 202b is installed in the bearing mounting hole of the right protective cover 202d. The bottom end of the right screw 202b is coaxially fixed with the output shaft of the driving motor 202e through the coupling 202j. The coupling 202j is installed in the bearing mounting hole on the surface of the bottom plate 201a of the width adjustment supporting stand 201. The driving motor 202e is fixedly installed in the motor mounting sleeve designed on the bottom surface of the horizontal plate 102 of the width expansion adjustment mechanism. The motor mounting sleeve has heat dissipation holes and wiring ports. Thus, the driving motor 202e can drive the rotation of the right screw 202b. The top end of the right guide rod 202c is fixed in the fixing hole opened in the right protective cover 202d, and the bottom end is connected and fixed with the screw thread designed on the surface of the bottom plate 201a of the width adjustment supporting stand 201. Therefore, the driving motor 202e can drive the rotation of the right screw 202b through the right guide rod 202c.

The left guiding mechanism described above consists of a left column-shaped shell 202f, which is fixed at its base to the left side of the surface of the bottom plate 201a of the width adjustment supporting stand 201 and is secured at the top by the left protective cover 202i, providing protection for the internal components through the left column-shaped shell 202f and the left protective cover 202i. Inside the left column-shaped shell 202f, there are two vertically arranged guiding rods: the left coarse guide rod 202g and the left fine guide rod 202h. The top end of the left coarse guide rod 202g is fixedly mounted in the fixed hole of the left protective cover 202i, and the bottom end is fixed to the surface of the bottom plate 201a of the width adjustment supporting stand 201 by a screw. The top end of the left fine guide rod 202h is also fixedly mounted in the fixed hole of the left protective cover 202i, and the bottom end is fixed to the surface of the bottom plate 201a of the width adjustment supporting stand 201 by a screw thread.

The hollow concave roller 203 and hollow convex roller 204 are installed vertically between the left guiding mechanism and the right driving mechanism, respectively. They are mounted using the concave roller slider and convex roller fixing block. The concave roller slider includes a left slider 203a, a right slider 203b, and a concave roller connection shaft 203c. The front ends of the left and right sliders are opposite and are fixed to both ends of the concave roller connecting shaft. The left slider end is designed with a hole to fit on the left coarse guide rod 202g and the left fine guide rod 202h. The right slider end has a hole that fits on the right screw 202b and right guide rod 202c. A concave roller slider 205 is installed between the hole and the right screw 202b, and the concave roller slider 205 is fixed to the left slider 203a and connected to the right screw 202b using internal thread structure. The hollow concave roller 203 is externally fitted on the concave roller slider and rotates passively by means of bearings at both ends that connect to the front ends of the left and right sliders, respectively.

The convex roller fixing block includes a left fixing block 204a, a right fixing block 204b, and a convex roller connection shaft 204c. The front ends of the left fixing block 204a and the right fixing block 204b are opposite and are respectively connected and fixed to the two ends of the convex roller connecting shaft. The end of the left fixing block 204a is designed with an opening for fixing, which is fitted onto the left coarse guide rod 202g and the left fine guide rod 202h. The end of the right fixing block 204b is designed with an opening and is fitted onto the right screw 202b and the right guide rod 202c. The hollow convex roller 204 is fitted onto the outer side of the convex roller fixing block, and the two ends of the hollow convex roller 204 are connected to the front ends of the left fixing block 204a and the right fixing block 204b through bearings, realizing the passive rotation of the hollow convex roller 204.

Therefore, by driving the right screw 202b through the driving motor 202e, the hollow convex roller 204 can be moved vertically, allowing for adjustment of the gap between the hollow convex roller 204 and the hollow concave roller 203. During the movement of the hollow convex roller 204, the gap between the hollow convex roller 204 and the hollow concave roller 203 is always equal, achieving the adjustment of fiber widening and thickening passing through both rollers. The installation frame of the above-mentioned hollow convex roller 204 and hollow concave roller 203 widening adjustment mechanism is fixed on the corresponding position of the vertical plate 101, which has fiber through holes for the fiber to pass through to the subsequent equipment after fiber widening and thickening adjustment.

Figure 5:
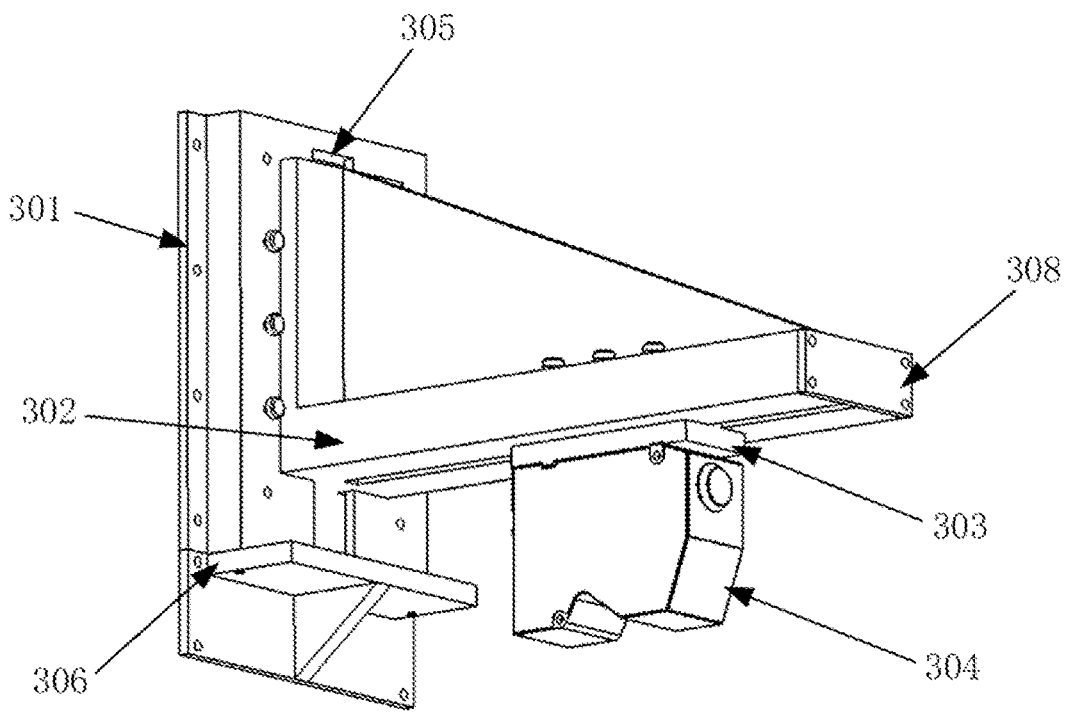
FIG. 5 shows the laser measuring mechanism of the real-time adjustment device for width and thickness of impregnated fiber bundles depicted in FIG. 1.

The width measuring laser mechanism 3 includes a vertical guide rail 301, a laser adjustment plate 302, a horizontal slider 303, and width measurement laser emitter 304, as shown in FIG. 5. The vertical guide rail 301 has a vertical sliding groove 305 designed in the middle for the laser adjustment plate 302 to slide vertically. The laser adjustment plate 302 is equipped with a back slider that enters the vertical sliding groove 305 through the lower end sliding groove port of the vertical guide rail 301, allowing the laser adjustment plate 302 to slide vertically along the vertical guide rail 301. Additionally, screw holes are evenly spaced along the vertical guide rail 301 on both sides for installing tightening screws. After the laser adjustment plate 302 is adjusted to the appropriate position, the tightening screws on both sides of the laser adjustment plate 302 are tightened to secure the laser adjustment plate 302 in place. A bottom stop plate 306 is fixedly installed at the lower end of the vertical guide rail 301 to close the lower end sliding groove port and limit the movement of the laser adjustment plate 302 within the sliding groove. The lower surface of the laser adjustment plate 302 is designed with a horizontal sliding groove 307 perpendicular to the vertical guide rail 301, and the back of the horizontal slider 303 is equipped with a slider portion that enters the horizontal sliding groove 307 through the front end sliding groove port of the laser adjustment plate 302, allowing the horizontal slider 303 to move horizontally along the horizontal sliding groove 307. Similarly, screw holes are evenly spaced on both sides of the horizontal sliding groove 307 in the front-to-back direction for installing tightening screws. After the horizontal slider 303 is adjusted to the appropriate position, the tightening screws on both sides of the horizontal slider 303 are tightened to secure the slider portion of the horizontal slider 303 in place. A side stop plate 308 is also fixedly installed at the front end of the laser adjustment plate 302 to close the front end sliding groove port and limit the movement of the horizontal slider 303 within the horizontal sliding groove 307.

The bottom surface of the horizontal slider 303 is used as the installation position for the width measurement laser emitter 304. The width measurement laser emitter 304 is fixedly mounted with its emission direction facing downwards, allowing it to be compatible with various types of laser emitters. By using the designed laser adjustment plate 302 and the installation method of the horizontal slider 303, the position of the width measurement laser emitter 304 can be adjusted by moving the horizontal slide 303, achieving measurement of fiber expansion at different positions. Depending on the model of the width measurement laser emitter 304 mounted on the horizontal slider 303, various types of laser emitters can be used for measuring fiber expansion by adjusting the position of the laser emitter, thus enhancing the adaptability of the width measuring laser mechanism 3.

Both the width and thickness adjustment mechanism 2 and the width measuring laser mechanism 3 are fixedly mounted on the filar guide 4 of the composite winding machine. In the width and thickness adjustment mechanism 2, the vertical plate 101 of the body frame 1 is fixed to the filar guide 4 with screws, allowing the mechanism to be positioned below the wire guide head, and the axes of the hollow concave roller 203 and the hollow convex roller 204 are perpendicular to the fiber output direction. In the width measuring laser mechanism 3, the vertical guide rail 301 and the bottom baffle 306 are fixed to the filar guide 4 with screws, allowing the width measurement laser emitter 304 to be positioned between the filar guide 4 and the processing workpiece, and the laser emission direction of the width measurement laser emitter 304 faces the fiber output trajectory.

Figure 6:
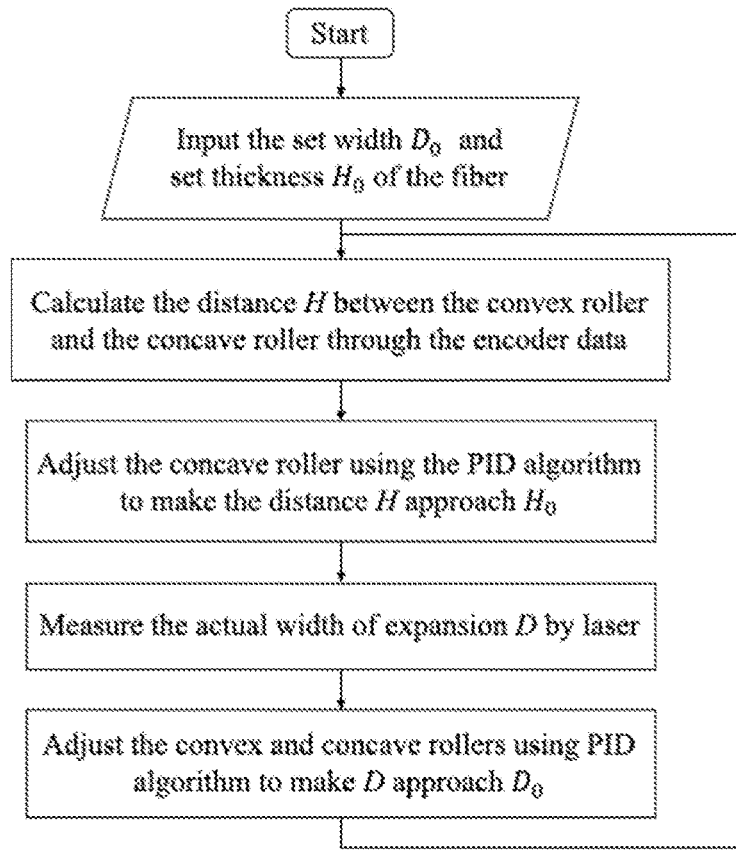
FIG. 6 shows a flowchart of the laser measurement and feedback control scheme for the real-time adjustment device for width and thickness of impregnated fiber bundles depicted in FIG. 1.

As shown in FIG. 6, in the process of adjusting the fiber bundles thickness in the present invention, the preset fiber width $D_0$ and thickness $H_0$ are first set in the control system. The absolute rotation angle of the right screw 202b is measured in real time by the encoder mounted on the driving motor 202e, and the distance H between the hollow convex roller 204 and the hollow concave roller 203 is calculated, which is approximately regarded as the actual thickness of the carbon fiber yarn 5. The PID formula for thickness adjustment is applied using the calculated H to determine the adjustment direction and speed, which is then converted into the turning direction and speed of the driving motor 202e. The driving motor 202e is controlled to rotate the right screw 202b, causing the hollow concave roller 203 to move vertically, thereby approaching the preset thickness $H_0$.

In the process of adjusting the fiber bundles width, the fiber width D of the carbon fiber yarn 5 after adjustment by the width and thickness adjustment mechanism 2 is measured by the width measuring laser mechanism 3. The PID formula for width adjustment is applied using the measured D to determine the adjustment direction and speed, which is then converted into the pneumatic cylinder's air intake flow rate and direction. Pneumatic control is used to move the cylinder rod vertically, driving the width and thickness adjustment mechanism 2 to move vertically for adjustment, thus approaching the preset width $D_0$.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A real-time adjustment device for width and thickness of impregnated fiber bundles, comprising a width and thickness adjustment mechanism and a width measuring laser mechanism;
    wherein the width and thickness adjustment mechanism is arranged under a filar guide, and is moved vertically by a cylinder; the width and thickness adjustment mechanism has a hollow concave roller and a hollow convex roller arranged vertically, a position of the hollow convex roller is fixed, vertical positions of the hollow concave roller are controllable, and fibers pass between the hollow concave roller and the hollow convex roller;
    wherein the hollow convex roller and the hollow concave roller are both hollow rollers respectively passing through a left guide mechanism and a right screw drive mechanism; the right screw drive mechanism has a right screw and a right guide rod arranged vertically; wherein a top end of the right screw passes through a bearing connected to a top mounting surface; a lower end of the right screw is connected to an output shaft of a driving motor, and the right screw is driven by the driving motor to rotate; a top end of the right guide rod is fixed on the top mounting surface, and a bottom end of the right guide rod is fixed to a bottom mounting surface; the left guide mechanism has two left guide rods arranged vertically; top ends of the two left guide rods are fixed to the top mounting surface, and lower ends of the two left guide rods are fixed to the bottom mounting surface;
    wherein two ends of the hollow convex roller are respectively sleeved on two fixing blocks at a left side and a right side thereof through bearings, and the two fixing blocks are connected by a connection shaft of the hollow convex roller; an end of the fixing block at the left side thereof fixedly sleeves on the two left guide rods, and an end of the fixing block at the right side thereof sleeves on the right screw and simultaneously fixedly sleeves on the right guide rod;
    wherein two ends of the hollow concave roller are respectively sleeved on two sliders at a left side and a right side thereof through bearings, and the two sliders are connected by a connection shaft of the hollow concave roller; an end of the slider at the left side thereof sleeves on the two left guide rods, and an end of the slider at the right side thereof is sleeved on the right screw and the right guide rod and is screwed with the right screw;
    wherein the width measuring laser mechanism is arranged between the filar guide and a processing workpiece, and is a width measuring laser emitter installed through a width measuring laser emitter bracket, and an emitting end of the width measuring laser emitter faces the fibers; the width measuring laser emitter bracket includes a vertical guide rail, a laser adjustment plate, and a horizontal slider; the laser adjustment plate and the vertical guide rail are connected in a sliding manner; a middle part of a lower surface of the laser adjustment plate is designed with a horizontal slideway along a front-rear direction; the horizontal slider and the horizontal slideway are connected in a sliding manner; and the horizontal slider is configured to install the width measuring laser emitter;
    wherein a control system is configured to perform a method of measuring the width and thickness, the method comprising: firstly, presetting a default width $D_0$ and a default thickness $H_0$ of the fibers in the control system;

measuring an absolute rotation angle of the right screw in real time, and then calculating a distance H between the hollow convex roller and the hollow concave roller, as an actual thickness of a carbon fiber filament; bringing H into the PID formula of thickness adjustment, calculating an adjustment direction and an adjustment speed, and converting the adjustment direction and the adjustment speed into a steering and a speed of the driving motor, and controlling the driving motor to drive the right screw to rotate, so that the hollow concave roller moves vertically, and H approaches the default thickness $H_0$;

when adjusting the width of the tow, measuring the width D of the carbon fiber filament after the carbon fiber filament is adjusted by the width and thickness adjustment mechanism through the width measuring laser emitter; bringing D into the PID formula of the width adjustment, calculating the adjustment direction and the adjustment speed, and converting the adjustment direction and the adjustment speed into an air intake flow rate and an intake direction of the cylinder, pneumatically controlling a cylinder rod of the cylinder to move vertically, and driving the width and thickness adjustment mechanism to move vertically, so that D approaches the default width $D_0$.

2. The real-time adjustment device for width and thickness of impregnated fiber bundles according to claim 1, wherein the cylinder is fixedly installed on a side plate, and the width and thickness adjustment mechanism is slidably connected with the side plate.

3. The real-time adjustment device for width and thickness of impregnated fiber bundles according to claim 1, wherein each of the left guide mechanism and the right screw drive mechanism has a column-shaped shell and a protective cover installed on a top portion of the shell.

* * * * *